US012781077B2

(12) United States Patent
Murakami et al.

(10) Patent No.: US 12,781,077 B2
(45) Date of Patent: Nov. 3, 2026

(54) INK COMPOSITION FOR AQUEOUS INKJET TEXTILE PRINTING

(71) Applicant: SAKATA INX CORPORATION, Osaka (JP)

(72) Inventors: Masaki Murakami, Osaka (JP); Hiroyuki Konishi, Osaka (JP); Ryuta Noda, Osaka (JP); Masahiro Ueki, Osaka (JP); Satoshi Hirakawa, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 195 days.

(21) Appl. No.: 18/549,866

(22) PCT Filed: Feb. 8, 2022

(86) PCT No.: PCT/JP2022/004857

§ 371 (c)(1),
(2) Date: Sep. 8, 2023

(87) PCT Pub. No.: WO2022/201923

PCT Pub. Date: Sep. 29, 2022

(65) Prior Publication Data

US 2024/0166906 A1 May 23, 2024

(30) Foreign Application Priority Data

Mar. 24, 2021 (JP) ................................ 2021-050258

(51) Int. Cl.
*C09D 11/38* (2014.01)
*C09D 11/322* (2014.01)

(52) U.S. Cl.
CPC ........... *C09D 11/38* (2013.01); *C09D 11/322* (2013.01)

(58) Field of Classification Search
CPC ..... C09D 11/38; C09D 11/322; C09D 11/102; C09D 11/106; C09D 11/30; D06P 1/44; D06P 1/5221; D06P 1/525; D06P 1/5257; D06P 1/5285; D06P 1/54; D06P 1/6424; D06P 5/30; B41J 2/01; B41M 5/00
See application file for complete search history.

(56) References Cited

U.S. PATENT DOCUMENTS

| | | | |
|---|---|---|---|
| 11,926,125 B2 | 3/2024 | Suzuki et al. | |
| 2017/0369725 A1 | 12/2017 | Mitsuyoshi et al. | |
| 2020/0115576 A1 | 4/2020 | Kodama et al. | |
| 2020/0239717 A1 | 7/2020 | Sato et al. | |

FOREIGN PATENT DOCUMENTS

| | | | | |
|---|---|---|---|---|
| JP | 2001055530 A | * | 2/2001 | |
| JP | 2003268271 A | | 9/2003 | |
| JP | 2006282759 A | * | 10/2006 | |
| JP | 2009215506 A | * | 9/2009 | |
| JP | 2016125057 A | * | 7/2016 | ............... B41J 2/01 |
| JP | 2018131581 A | | 8/2018 | |
| JP | 2019031611 A | * | 2/2019 | ............... D06P 1/54 |
| JP | 006712379 B1 | | 6/2020 | |
| JP | 2022034320 A | * | 3/2022 | ............... D06P 5/30 |
| WO | 2020022192 A1 | | 1/2020 | |

OTHER PUBLICATIONS

English machine translation JP 2001055530 A (Year: 2001).*
English machine translation of JP 2001055530 A (Year: 2001).*
English machine translation of Komada (JP_2022034320_A) (Year: 2022).*
A Notice of Reasons for Refusal issued by the Japanese Patent Office, mailed Mar. 11, 2025, for Japanese counterpart application No. 2021-050258. (3 pages).
Extended European Search Report (EESR) dated May 27, 2025, issued for European counterpart patent application No. EP22774724.3 (7 pages).
International Preliminary Report on Patentability, dated Sep. 12, 2023, for corresponding international application PCT/JP2022/004857 (1 page).
Notification Concerning Transmittal of International Preliminary Report on Patentability, mailed Oct. 5, 2023, for corresponding international application PCT/JP2022/004857 (1 page).
Notification of Transmittal of Translation of the International Preliminary Report on Patentability, mailed Oct. 5, 2023, for corresponding international application PCT/JP2022/004857 (1 page).
Written Opinion of the International Searching Authority, mailed Apr. 26, 2022, for corresponding international application PCT/JP2022/004857 (8 pages).
International Search Report (ISR) mailed Apr. 26, 2022, issued for International application No. PCT/JP2022/004857. (2 pages).
A Decision of Dismissal of Amendment issued by the Japanese Patent Office, mailed Jul. 8, 2025, for Japanese counterpart application No. 2021-050258. (3 pages).

(Continued)

*Primary Examiner* — Kristal Feggins
*Assistant Examiner* — Natasha Dephenia Quinn
(74) *Attorney, Agent, or Firm* — Law Office of Katsuhiro Arai

(57) ABSTRACT

An object is to achieve an ink composition for aqueous inkjet textile printing excellent in nozzle plate liquid repellency, contamination protection of a nozzle plate, and discharge property, as well as both sufficient image density and fastness to washing. As a solution, an ink composition for aqueous inkjet textile printing is provided that includes a pigment, a water-dispersible resin, a surfactant, a crosslinking agent, and water, wherein as the surfactant, a nonionic surfactant having a hydrophilic-lipophilic balance (HLB) of 1.0 to 5.0 is contained by 0.1 to 3.0% by mass relative to a total amount of the ink composition, and as the crosslinking agent, a blocked isocyanate by 0.1 to 5.0% by mass is contained relative to the total amount of the ink composition.

4 Claims, No Drawings

(56) References Cited

OTHER PUBLICATIONS

A First Office Action with Search Report issued by the Patent Office of the People's Republic of China on Mar. 19, 2025, for Chinese counterpart application No. 202280020146.5 (7 pages).

* cited by examiner

INK COMPOSITION FOR AQUEOUS INKJET TEXTILE PRINTING

CROSS-REFERENCE TO RELATED APPLICATIONS

This application is the U.S. National Phase under 35 U.S.C. § 371 of International Application PCT/JP2022/004857, filed Feb. 8, 2022, which claims priority to Japanese Patent Application No. JP2021-050258, filed Mar. 24, 2021. The International Application was published under PCT Article 21 (2) in a language other than English.

TECHNICAL FIELD

The present invention relates to an ink composition for aqueous inkjet textile printing.

BACKGROUND ART

As an ink composition for aqueous inkjet textile printing, those combining a surfactant having a high hydrophilic-lipophilic balance (HLB) value, a urethane resin of relatively low fracture elongation, and a crosslinking agent are known, as described in Patent Literature 1. As disclosed in Patent Literature 2, an ink composition for aqueous inkjet textile printing is also publicly known that includes a blocked isocyanate as the crosslinking agent and has a high HLB value.

However, such an ink composition for aqueous inkjet textile printing is poor in nozzle plate liquid repellency, contamination protection of a nozzle plate, and discharge property, and is further unable to provide both sufficient image density and fastness to washing.

BACKGROUND ART LITERATURE

Patent Literature

Patent Literature 1: Japanese Patent Laid-open No. 2009-215506

Patent Literature 2: Japanese Patent Laid-open No. 2018-131581

SUMMARY OF THE INVENTION

Problems to be Solved by the Invention

In light of the above, an object of the present invention is to achieve, as an ink composition for aqueous inkjet textile printing, excellent nozzle plate liquid repellency, contamination protection of a nozzle plate, and discharge property, as well as both sufficient image density and fastness to washing.

Means for Solving the Problems

As a result of studying in earnest to achieve the aforementioned object, the inventors obtained the following ink composition for aqueous inkjet textile printing.

1. An ink composition for aqueous inkjet textile printing includes a pigment, a water-dispersible resin, a surfactant, a crosslinking agent, and water, wherein, as the surfactant, a nonionic surfactant having a hydrophilic-lipophilic balance (HLB) of 1.0 to 5.0 is contained by 0.1 to 3.0% by mass relative to a total amount of the ink composition, and as the crosslinking agent, a blocked isocyanate is contained by 0.1 to 5.0% by mass relative to the total amount of the ink composition.
2. An ink composition for aqueous inkjet textile according to 1, wherein the surfactant may include a nonionic surfactant having an HLB of 1.0 to 3.0.
3. An ink composition for aqueous inkjet textile according to 1 or 2, wherein the water-dispersible resin may include at least one type selected from a urethane-based resin and a styrene acrylic-based resin.

Effects of the Invention

According to the ink composition for aqueous inkjet textile printing of the present invention, it demonstrates significant effects in terms of excellent nozzle plate liquid repellency, excellent contamination protection of a nozzle plate, and excellent discharge property, as well as both sufficient image density and fastness to washing.

MODE FOR CARRYING OUT THE INVENTION

The ink composition for aqueous inkjet textile printing proposed by the present invention (hereinafter, also referred to as an ink composition proposed by the present invention) is explained in detail below, primarily in regard to its components.

<Pigments>

The ink composition for aqueous inkjet textile printing of the present invention includes one or more pigments of different hues to give ink compositions for aqueous inkjet textile printing of different colors.

Such pigments may include, without particular limitation, any pigments such as organic pigments or inorganic pigments conventionally used in a normal ink composition for inkjet printing.

Alternatively, a resin-coated pigment may be employed that is obtained by coating an organic or inorganic pigment with a resin layer. It should be noted that, in the present invention, colored resin particles containing polymers having an acid value of 5 to 100 mgKOH/g or dye may, but does not necessarily have to, be used.

Examples of the organic pigments include a dye lake pigment, azo-based, benzimidazolone-based, phthalocyanine-based, quinacridone-based, anthraquinone-based, dioxazine-based, indigo-based, thioindigo-based, perylene-based, perinone-based, diketo-pyrrolo-pyrrole-based, isoindolinone-based, nitro-based, nitroso-based, flavanthrone-based, quinophthalone-based, pyranthrone-based, and indanthrone-based pigments. Examples of inorganic pigments include carbon black, titanium oxide, red iron oxide, iron black, iron black, chromium oxide green, and aluminum hydroxide.

Also, specific examples of pigments, by each representative hue, for the ink composition for aqueous inkjet textile printing proposed by the present invention, are as follows.

First, examples of yellow pigments used as the ink composition for aqueous inkjet textile printing include C.I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, and 213, and preferably include C.I. Pigment Yellow 13, 14, 17, 74, 155, and 213.

Examples of magenta pigments used as the ink composition for aqueous inkjet textile printing include C.I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, and C.I. Pigment Violet 19, and preferably include C.I. Pigment Red 122, 202, and C.I. Pigment Violet 19.

Examples of cyan pigments used as the ink composition for aqueous inkjet textile printing include C.I. Pigment Blue 1, 2, 3, 15, 15:1, 15:2, 15:3, 15:4, 15:6, 16, 18, 22, 27, 29, and 60, and preferably include C.I. Pigment Blue 15:3.

An example of a black pigment used as the ink composition for aqueous inkjet textile printing includes carbon black (C.I. Pigment Black 7).

Examples of white pigments used as the ink composition for aqueous inkjet textile printing include titanium oxide and aluminum oxide, and preferably include titanium oxide that is surface-treated with various materials including, for example, alumina and silica.

The content of the pigment included in the ink composition for aqueous inkjet textile printing of the present invention is preferably 1.0 to 20.0% by mass with respect to the total amount of the ink composition for aqueous inkjet textile printing. If the content of the pigment is less than 1.0% by mass, the image quality of the obtained printed matter tends to decrease. In contrast, if the content of the pigment exceeds 20.0% by mass, an adverse effect tends to be imposed on a viscosity property of the ink composition for aqueous inkjet textile printing.

<Pigment Dispersant>

Also, the ink composition for aqueous inkjet textile printing of the present invention may further include a pigment dispersant as necessary.

A pigment dispersant is used to further improve dispersibility of the pigment and the storage stability of the ink composition of the present invention, and although any of traditionally-used pigment dispersants may be used without any particular limitations, among them, use of a polymeric dispersant is preferred. Examples of such a pigment dispersant include carbodiimide-based dispersants, polyester amine-based dispersants, fatty acid amine-based dispersants, modified polyacrylate-based dispersants, modified polyurethane-based dispersants, multichain polymeric nonionic dispersants, and polymer ion activators. Any of these pigment dispersants may be used singly or in combination of two or more thereof.

In particular, an acrylic acid/lauryl acrylate/styrene copolymer is preferably used.

The above-mentioned pigment dispersant is preferably included by 1 to 200 parts by mass relative to the entire pigment used considered as 100 parts by mass. If the content of the pigment dispersant is less than 1 part by mass, pigment dispersibility and storage stability of the ink composition of the present invention decrease in some cases. In contrast, the content may exceed 200 parts by mass, but there may be no difference in the advantageous effects. In particular, the content of the pigment dispersant is more preferably 5 parts by mass or more, and is more preferably 60 parts by mass or less.

<Water-Dispersible Resin>

The water-dispersible resin of the present invention is preferably a urethane resin or a styrene-acrylic resin.

Among urethane resins, a polyether polyurethane resin, a polyester polyurethane resin, and a polycarbonate polyurethane resin are more preferable. Furthermore, a polyether polyester polyurethane resin is even more preferable.

Of the water-dispersible resins having physical properties as described above, the urethane resin may be, for example, NeoRez R-966, NeoRez R-967 (DSM), TAKELAC W-6110, TAKELAC WS-5000 (Mitsui Chemicals, Inc.), Bayhydrol UH 650, Impranil DLP-R, Baybond PU 407 (Sumika Covestro Urethane Co., Ltd.), SUPERFLEX 300, SUPERFLEX 740 (DKS Co. Ltd.), DAOTANTW6491, or DAOTANTW6495 (DAICEL-ALLNEX LTD.).

The styrene-acrylic resin is a copolymer of styrene, (meth)acrylic acid, and (meth)acrylic acid alkyl ester. And, a known monomer may be employed that can be used as a comonomer in an acrylic resin such as acrylamide or acrylonitrile within a range that does not impair the advantageous effects brought by the styrene-acrylic-based resin emulsion.

As such styrene-acrylic resin, for example, YODOSOL AD199 (Henkel) or Mowinyl 966A (Japan Coating Resin Co., Ltd.) may be employed.

And, the water-dispersible resin is preferably included so as to be 0.01 to 2.0 parts by mass relative to 1 part by mass of the pigment.

If it is less than 0.01 parts by mass, fastness to washing or fastness to drying and rubbing may possibly decrease. Also, if it exceeds 2.0 parts by mass, texture after being cured may possibly be poor.

In the present invention, only one type of water-dispersible resin is preferably used. Also, in a case where two or more types of the water-dispersible resins are used, all the resins need to satisfy the physical properties in the present invention.

It should be noted that other resins may be used in combination with the water-dispersible resin in the present invention within a range that the advantageous effects of the present invention are exerted.

<Surfactant>

The ink composition for aqueous inkjet textile printing of the present invention includes a nonionic surfactant having an HLB of 1.0 to 5.0. Among them, those having an HLB of 1.3 or higher are preferred, and those having an HLB of 1.5 or higher are more preferred. Furthermore, those having an HLB of 4.5 or lower are preferred, those having an HLB of 4.0 or lower are more preferred, and those having an HLB of 3.5 or lower are even more preferred.

For the surfactant in the present invention, for example, a polyoxyethylene polyoxypropylene block polymer, acethylene glycol, or ethylene oxide adduct of acethylene glycol may be used, and a nonionic fluorine-based surfactant may, but does not necessarily have to, be used.

If a surfactant having an HLB exceeding 5.0 is used, the nozzle plate liquid repellency, the contamination protection of a nozzle plate, and discharge property will be poor, and if a surfactant that is not nonionic is used, the image density will additionally be poor.

Also, a surfactant other than the nonionic surfactant, for example, anionic, cationic, or amphoteric surfactant may be included, but even in such a case, it is included by an amount that it does not hinder the advantageous effects achieved by the present invention. The nonionic surfactant having an HLB exceeding 5.0 may be used in combination, but even in such a case, as long as it does not hinder the advantageous effects achieved by the present invention, it is preferably 0.5 parts by mass or less relative to the content of the nonionic surfactant having an HLB of 1.0 to 5.0 considered as 1 part by mass.

The content of the nonionic surfactant having an HLB of 1.0 to 5.0 in the ink composition of the present invention is 0.1 to 3.0% by mass relative to the total amount of the ink composition for aqueous inkjet textile printing, preferably 0.3% by mass or more, and more preferably 0.7% by mass or more. Additionally, it is preferably 2.7% by mass or less, and more preferably 2.0% by mass or less.

If it is less than 0.1% by mass, surface tension of the ink composition for aqueous inkjet textile printing of the present invention is increased, which decreases discharge stability from an inkjet head. In contrast, if it exceeds 3.0% by mass, foam is increased in the ink composition for aqueous inkjet textile printing, which decreases discharge stability.

<Crosslinking Agent>

A blocked isocyanate compound is used as the crosslinking agent of the present invention. It should be noted that one or more types selected from, for example, a carbodiimide compound, an oxazoline group-containing polymer, an epoxy compound, an adduct of formaldehyde with, for example, urea, melamine, or benzoguanamine, a polyfunctional aziridine compound to the extent that it does not hinder the advantageous effects of the present invention.

Furthermore, a crosslinking agent that is dispersed, emulsified, or dissolved in water or is capable of being dispersed, emulsified, and/or dissolved in water is particularly preferable.

In the present invention, the crosslinking agent is included by 0.1 to 5.0% by mass relative to the total amount of the ink composition for aqueous inkjet textile printing. Specifically, it is preferably 0.5% by mass or more, more preferably 1.0% by mass or more, and even more preferably 1.5% by mass or more. Additionally, it is preferably 4.5% by mass or less, more preferably 4.0% by mass or less, even more preferably 3.5% by mass or less, and most preferably 3.0% by mass or less.

If the concentration of the crosslinking agent is less than 0.1% by mass, a textile-printed matter will be poor in fastness to washing, and if the concentration exceeds 5.0% by mass, discharge property will be poor.

Furthermore, the content is preferably 0.02 to 0.6 parts by mass, more preferably 0.1 to 0.4 parts by mass, and even more preferably 0.15 to 0.3 parts by mass relative to 1 part by mass of the water-dispersible resin.

If it is less than 0.02 parts by mass, fastness to washing or fastness to drying and rubbing may possibly decrease. If it exceeds 0.6 parts by mass, texture after being cured may possibly be poor.

The blocked isocyanate compound used as the crosslinking agent in the present invention is a compound obtained by previously reacting an active isocyanate group of a polyisocyanate compound with a blocking agent such as phenol so that the active isocyanate group is deactivated. The blocked isocyanate crosslinking agent as it is cannot cause a cross-linking reaction and is chemically stable. However, when a blocking group bonded to the isocyanate group is dissociated by, for example, a heat treatment to form an active isocyanate group, the blocked isocyanate crosslinking agent is brought into a state in which a cross-linking reaction is enabled.

The compound that constitutes a polyisocyanate part of the blocked isocyanate compound preferably includes a diisocyanate compound, triisocyanate compound, or polyisocyanate compound, and examples include hexamethylene diisocyanate, trimethyl hexamethylene diisocyanate, hexamethylene triisocyanate, lysine ester triisocyanate, isophorone diisocyanate, hydrogenated xylylene diisocyanate, toluene diisocyanate, xylene diisocyanate, and diphenylmethane diisocyanate. Among these, the triisocyanate compound including, for example, a modified product of hexamethylene diisocyanate such as a trisbiuret-modified product of hexamethylene diisocyanate is more preferable.

Such a compound that constitutes the polyisocyanate part includes a polyisocyanate compound having two or more isocyanate groups per molecule, and examples thereof include various polyisocyanate compounds including, for example, diisocyanate compounds, triisocyanate compounds, tetraisocyanate compounds, pentaisocyanate compounds, and hexaisocyanate compounds. Specific examples of the polyisocyanate compounds include: tolylenediisocyanate, xylylene diisocyanate, diphenylmethane diisocyanate, biphenyl diisocyanate, 3,3'-dimethyl-4,4'-biphenylene diisocyanate, methylene bis(phenyl isocyanate), isophorone diisocyanate, and other aromatic polyisocyanates; hydrogenated tolylene diisocyanate, hydrogenated xylylene diisocyanate, hydrogenated diphenylmethane diisocyanate, and other alicyclic polyisocyanates; 1,4-tetramethylene diisocyanate, hexamethylene diisocyanate, 2,2,4-trimethyl hexamethylene diisocyanate, and other aliphatic polyisocyanates. One type of polyisocyanate compound may be used, or multiple types of polyisocyanate compounds may be used, to constitute the blocked isocyanate crosslinking agent according to the present embodiment. In view of minimizing an outflow of an adhesive, the polyisocyanate compound that constitutes the blocked isocyanate crosslinking agent according to the present embodiment preferably includes a triisocyanate compound.

The blocking agent associated with the blocked isocyanate crosslinking agent is not particularly limited. Besides the aforementioned phenol, a cresol, ethyl phenol, butyl phenol, 2-hydroxy pyridine, dimethyl malonate, diethyl malonate, methyl acetoacetate, ethyl acetoacetate, acetyl acetone, butyl mercaptan, dodecyl mercaptan, acetanilide, amide acetate, F-caprolactam, S-valerolactam, 7-butyrolactam, imide succinate, imide maleate, imidazole, 2-methyl imidazole, urea, thiourea, ethylene urea, formaldoxime, acetaldoxime, acetone oxime, methyl ethyl ketoxime, methyl isobutyl ketoxime, cyclohexanone oxime, carbazole, dimethylpyrazole, triazole, and the like can be used. The blocked isocyanate crosslinking agent according to the present embodiment may be used singly or in combination of two or more thereof. Furthermore, a combination of the blocking agent and the polyisocyanate compound is not particularly limited, and there may be multiple combinations. The blocked isocyanate crosslinking agent according to the present embodiment may be constituted by multiple types of compounds.

The blocked isocyanate compound is preferably a thermal decomposition type. When it is a thermal decomposition type, the temperature, at which a reaction to dissociate the blocking agent, i.e., deblocking reaction, becomes significant (hereinafter referred to as "deblocking temperature"), can be adjusted based on the type of the blocking agent, the type of the polyisocyanate compound to be blocked, and on the like. While the specific level of this deblocking temperature is not limited in any way, assume that this temperature is 70 to 130° C., for example; in this case, the ink composition for aqueous inkjet textile printing including a blocked isocyanate crosslinking agent having such a deblocking temperature will have a low, or virtually zero, crosslinking point density before crosslinking. However, the crosslinking density can be increased by promoting the crosslinking reaction to form crosslinked structures.

<Solvent>

In the present invention, the ink composition for aqueous inkjet textile printing may include water and a water-soluble organic solvent aiming at, for example, improving printing performance. The water-soluble organic solvent is selected from polyols such as glycerin, propylene glycol, and 1,3-butanediol, glycol ethers such as dipropylene glycol dimethyl ether and diethylene glycol ethyl methyl ether, glycol ether esters, alcohols, ketones, organic carbonates, and mixtures thereof.

And, the content of such a water-soluble organic solvent in the ink composition for aqueous inkjet textile printing is preferably 10% by mass or more, more preferably 15% by mass or more, and even more preferably 20% by mass or more. Additionally, it is preferably 35% by mass or less, more preferably 30% by mass or less, and even more preferably 27% by mass or less. A content exceeding 35% by mass may possibly cause hindrance in terms of viscosity, discharge property, and physical property of ink coating film.

<Additives>

Various additives are added to the ink composition for aqueous inkjet textile printing of the present invention as necessary to exhibit various functionalities. Specific examples include photostabilizers, surface treatment agents, antioxidants, antiaging agents, crosslinking promoters, plasticizers, preservatives, pH-adjusting agents, defoaming agents, and humectants. Furthermore, non-curable resins that function as vehicles may, but do not necessarily have to, be blended.

It should be noted that acrylic resin particles including an acrylic-based blocked isocyanate group do not necessarily have to be included.

A method for preparing the ink composition of the present invention is not limited to a particular method, and any conventionally known method for obtaining an ink composition for printing or an ink composition for aqueous inkjet textile printing may be employed.

Specifically, a method may be employed that previously dissolves an anionic group-containing resin in an alkaline aqueous solution, followed by adding a pigment to the solution and kneading.

The method for printing and curing the ink composition for aqueous inkjet textile printing of the present invention specifically includes a method in which the ink composition of the present invention is discharged onto a base material from an inkjet head, followed by heating and curing a coating film of the ink composition of the present invention that has landed on the base material.

For example, the discharging of the ink composition onto the base material (images of printing characters) is achieved by supplying the ink composition of the present invention to a printer head of an inkjet recording printer designed for a low-viscosity ink and discharging the ink composition from the printer head onto the base material so that the thickness of the coating film is, for example, 1 to 60 m.

Any conventionally used inkjet recording printer may be used as the inkjet recording printer that prints the ink composition for aqueous inkjet textile printing of the present invention.

The device used for heating and curing may be any known device for curing a thermally curable ink composition. Examples of the source of heat include infrared ray, electrically-heated wires, irons, or other devices that heat a base material by directly coming into contact with the base material.

It should be noted that in discharging the ink composition for aqueous inkjet textile printing of the present invention onto the base material, a pretreatment liquid may, but does not necessarily have to, be applied to the base material.

<Fabrics>

Base material to be printed with the ink composition for aqueous inkjet textile printing of the present invention may be any conventionally-used fabric; for example, fabrics made of cotton, silk, linen, rayon, acetate, nylon, or polyester fibers, or mixed fabrics made of two or more types of fibers selected from the foregoing, may be used.

EXAMPLES

Although the present invention is described in greater detail below using examples, the present invention is not limited to these examples only. It should be noted that, unless otherwise specified, "%" means "% by mass", while "part" means "part by mass".

The materials used in Examples and Comparative Examples below are listed below. In the table, the unit of numerical values in the rows related to pigments, dispersants, resins, solvents, and the total is "% by mass."

Evaluation Method

<Liquid Repellency of Nozzle Plate>

The ink compositions for aqueous inkjet textile printing according to Examples and Comparative Examples were dropped onto a silicone nozzle plate. After five minutes, the nozzle plate was vertically tilted to visually evaluate for how ink droplets remain on the nozzle plate according to the following evaluation criteria.

◎: Nothing remains on the nozzle plate

○: Ink partially remains on the nozzle plate

Δ: Ink entirely remains on the nozzle plate, but can be washed away with water x: Ink entirely remains on the nozzle plate and cannot be washed away with water <Contamination on Nozzle Plate>

A printer for evaluation equipped with a head KJ4B-YH available from KYOCERA Corporation was used to continuously print using each of the ink compositions for aqueous inkjet textile printing according to Examples and Comparative Examples, followed by visually evaluating in accordance with the following evaluation criteria.

◎: No contamination is found on the nozzle plate after actually printing for one continuous hour or longer.

○: No contamination is found on the nozzle plate after actually printing for continuous 15 minutes or longer but shorter than one continuous hour.

Δ: Contamination is found on the nozzle plate after actually printing for continuous 15 minutes or longer but shorter than one continuous hour, but the contamination can be washed away with water.

x: Contamination is found on the nozzle plate after actually printing for continuous 15 minutes or longer but shorter than one continuous hour, and the contamination cannot be washed away with water.

<Discharge Property>

A printer for evaluation equipped with a head KJ4B-YH available from KYOCERA Corporation was used to continuously print using each of the ink compositions for aqueous inkjet textile printing according to Examples and Comparative Examples, followed by evaluating in accordance with the following evaluation criteria.

◎: No discharging failure is found on all nozzles after actually printing for one continuous hour or longer.

○: No discharging failure is found on all nozzles after actually printing for continuous 15 minutes or longer but shorter than one continuous hour.

Δ: There is a nozzle that is unable to discharge after actually printing for continuous 15 minutes or longer but shorter than one continuous hour.

x: All the nozzles are unable to discharge after actually printing for continuous 15 minutes or longer but shorter than one continuous hour.

<Method for Fabricating Printed Matter for Evaluation (Using White Ink Composition)>

A black 100% cotton fabric was impregnated with 10 g of a treatment liquid for inkjet textile printing per A4 size, following which the impregnated fabric was heated and dried. The ink compositions for aqueous inkjet textile printing according to Examples and Comparative Examples were then printed in such a manner that solid printing overlaps 16 times, using a printer for evaluation equipped with a head KJ4B-YH available from KYOCERA Corporation. Subsequently, the fabrics on which the ink compositions were printed were each heated for one minute at a temperature of 170° C. using a heat press to thereby obtain printed matters for evaluation according to Examples and Comparative Examples.

<Method for Fabricating Printed Matter for Evaluation (Using Ink Composition Other than White Ink)>

The ink compositions for aqueous inkjet textile printing according to Examples and Comparative Examples were each printed on a white 100% cotton fabric using a printer for evaluation equipped with a head KJ4B-YH available from KYOCERA Corporation in such a manner that solid printing overlaps four times. Subsequently, the fabrics on which the ink compositions were printed were each heated for one minute at a temperature of 170° C. using a heat press to thereby obtain printed matters for evaluation according to Examples and Comparative Examples.

<Image Density (White Ink)>

Brightness (L*) of each of the printed matters of the Examples and Comparative Examples was measured using a chromometer (product name "DR-321" available from KONICA MINOLTA, INC.), followed by evaluating in accordance with the following evaluation criteria.

- ⊚: L* is 90 or higher.
- ○: L* is 80 or higher and lower than 90.
- Δ: L* is 60 or higher and lower than 80.
- x: L* is lower than 60.

<Image Density (Ink Other Than White Ink)>

An optical density (OD) of each of the printed matters of the Examples and Comparative Examples was measured using a chromometer (product name "DR-321" available from KONICA MINOLTA, INC.), followed by evaluating in accordance with the following evaluation criteria.

- ⊚: OD is 1.0 or higher.
- ○: OD is 0.8 or higher and lower than 1.0.
- Δ: OD is 0.6 or higher and lower than 0.8.
- x: OD is lower than 0.6.

<Fastness to Washing>

The printed matters of Examples and Comparative Examples were washed using a household washing machine in a normal manner (washing conditions: washing, spinning, and drying in a normal mode) five times, following which the brightness of each printed matter before and after washing was measured using a chromometer (product name "DR-321" available from KONICA MINOLTA, INC.). The change rate from an initial value of the brightness (L*) or the optical density (OD) before washing was then measured to evaluate in accordance with the following evaluation criteria.

- ⊚: The image density after washing remained by 90% or more of the initial value.
- ○: The image density after washing remained by 80% or more and less than 90% of the initial value.
- Δ: The image density after washing remained by 70% or more and less than 80% of the initial value.
- x: The image density after washing remained by less than 70% of the initial value.

Method for Preparing Ink, Etc.

- Titanium oxide (product name "TIPAQUE CR-90", alumina silica treated and having an average primary particle size of 0.25 m and an oil absorption of 21 ml/100 g, ISHIHARA SANGYO KAISHA, LTD.)
- Blue pigment (C.I. Pigment Blue 15:3, product name "LIONOL BLUE FG-7330", TOYOCOLOR CO., LTD.)
- Yellow pigment (C.I. Pigment Yellow 74, product name "Brilliant Yellow 5GX", CLARIANT)
- Red pigment (C.I. Pigment Red 122, product name "CROMOPHTAL PINK PT", BASF SE)
- Black pigment (C.I. Pigment Black 7, product name "MA 100", Mitsubishi Chemical Corporation)

<Preparation of Aqueous Acrylic Resin Varnish>

25 parts of an acrylic acid/lauryl acrylate/styrene copolymer having a mass-averaged molecular weight of 30,000 and an acid value of 140 mgKOH/g was dissolved in a mixed solution of 3.5 parts of potassium hydroxide and 71.5 parts of water to obtain an aqueous acrylic resin varnish having a solid content of 25%.

Preparation of Dispersion Liquid

<Preparation of Aqueous White Ink Base>

To 36 parts of the above-mentioned aqueous acrylic resin varnish was added 19 parts of water and mixed, following which 45 parts of titanium oxide was further added. This was then agitated to be mixed, followed by kneading using a wet circulation mill to thereby obtain an aqueous white ink base.

<Preparation of Aqueous Blue Ink Base>

To 16 parts of the above-mentioned aqueous acrylic resin varnish was added 64 parts of water and mixed, following which 20 parts of the blue pigment was further added. This was then agitated to be mixed, followed by kneading using a wet circulation mill to thereby obtain an aqueous blue ink base.

<Preparation of Aqueous Yellow Ink Base>

To 16 parts of the above-mentioned aqueous acrylic resin varnish was added 64 parts of water and mixed, following which 20 parts of the yellow pigment was further added. This was then agitated to be mixed, followed by kneading using a wet circulation mill to thereby obtain an aqueous yellow ink base.

<Preparation of Aqueous Red Ink Base>

To 16 parts of the above-mentioned aqueous acrylic resin varnish was added 64 parts of water and mixed, following which 20 parts of the red pigment was further added. This was then agitated to be mixed, followed by kneading using a wet circulation mill to thereby obtain an aqueous red ink base.

<Preparation of Aqueous Black Ink Base>

To 16 parts of the above-mentioned aqueous acrylic resin varnish was added 64 parts of water and mixed, following which 20 parts of the black pigment was further added. This was then agitated to be mixed, followed by kneading using a wet circulation mill to thereby obtain an aqueous black ink base.

<Preparation of Treatment Liquid for Inkjet Textile Printing>

To 83.7 parts of water were added 10 parts of calcium nitrate tetrahydrate, 6.0 parts of a nonionic styrene-acrylic-based self-crosslinkable resin emulsion (product name: Mowinyl 966A, available from Japan Coating Resin Corporation and having a solid content of 45% by mass) having a glass-transition temperature of −30° C., and 0.3 parts of Acetylenol E100 (having an HLB of 13.5, ethylene oxide adduct of acetylene glycol, available from Kawaken Fine Chemicals Co., Ltd.), which was then agitated to obtain a treatment liquid for inkjet textile printing.

(Water-Dispersible Resins)

NeoRez R-966 (DSM) (polyether polyurethane resin (content of active component: 33% by weight))

Bayhydrol UH 650 (Sumika Covestro Urethane Co., Ltd.) (polyester polyurethane resin (content of active component: 50% by weight))

TAKELAC W-6110 (Mitsui Chemicals, Inc.) (polycarbonate polyurethane resin (content of active component: 32% by weight))

Mowinyl 966A (Japan Coating Resin Corporation) (styrene-acrylic resin (content of active component: 45% by weight))

(Crosslinking Agent)

Bayhydur BL2867 (Sumika Covestro Urethane Co., Ltd.) (blocked isocyanate (content of active component: 38% by weight))

EPOCROS WS-700 (NIPPON SHOKUBAI CO., LTD.) (oxazoline group-containing acrylic (content of active component: 25% by weight))

CARBODILITE V-02 (Nisshinbo Chemical Inc.) (carbodiimide (active component: 40% by weight))

(Surfactants)

NEWPOL PE-71 (Sanyo Chemical Industries, Ltd.) (polyoxyethylene polyoxypropylene block polymer (active component: 100% by weight)) nonionic surfactant, HLB value: 1.9

NEWPOL PE-62 (Sanyo Chemical Industries, Ltd.) (polyoxyethylene polyoxypropylene block polymer (active component: 100% by weight)) nonionic surfactant, HLB value: 4.2

SURFYNOL 104PG-50 (Nissin Chemical Industry Co., Ltd.) (acethylene glycol (active component: 50% by weight)) nonionic surfactant, HLB value: 4.0

NEWPOL PE-74 (Sanyo Chemical Industries, Ltd.) (polyoxyethylene polyoxypropylene block polymer (active component: 100% by weight)) nonionic surfactant, HLB value: 8.1

SURFYNOL 440 (Nissin Chemical Industry Co., Ltd.) (ethylene oxide adduct of acethylene glycol (active component: 100% by weight)) nonionic surfactant, HLB value: 8.0

LATEMUL E-150 (Kao Corporation) (sodium polyoxyethylene lauryl ether sulfate (active component: 33% by weight)) anionic surfactant AMPHITOL 20AB (Kao Corporation) (lauric acid amidopropyl betaine (active component: 30% by weight)) amphoteric surfactant OLFINE E1010 (Nissin Chemical Industry Co., Ltd.) (ethylene oxide adduct of acethylene glycol (active component: 100% by weight)) nonionic surfactant, HLB value: 13.0 to 14.0

TABLE 1

| | | Examples | | | |
|---|---|---|---|---|---|
| | | 1 | 2 | 3 | 4 |
| Ink base | Aqueous white ink base | 20.0 | 20.0 | 20.0 | 20.0 |
| | Aqueous blue ink base | | | | |
| | Aqueous yellow ink base | | | | |
| | Aqueous red ink base | | | | |
| | Aqueous black ink base | | | | |
| Water-dispersible resin | NeoRez R-966 | 24.2 | 24.2 | 24.2 | 24.2 |
| | Bayhydrol UH 650 | | | | |
| | TAKELAC W-6110 | | | | |
| | Mowinyl 966A | | | | |

TABLE 1-continued

| | | | | | |
|---|---|---|---|---|---|
| Crosslinking agent | Bayhydur BL2867 | 6.0 | 6.0 | 6.0 | 6.0 |
| Surfactant | NEWPOL PE-71 | 1.0 | 0.5 | 2.5 | |
| | NEWPOL PE-62 | | | | 1.0 |
| | SURFYNOL 104PG-50 | | | | |
| | OLFINE E1010 | 0.4 | 0.4 | 0.4 | 0.4 |
| Water-soluble organic solvent | Glycerin | 18.0 | 18.0 | 18.0 | 18.0 |
| | Propylene glycol | 5.0 | 5.0 | 5.0 | 5.0 |
| | 1,3-butanediol | 2.0 | 2.0 | 2.0 | 2.0 |
| | Water | 23.4 | 23.9 | 21.9 | 23.4 |
| | Total | 100.0 | | | |
| Evaluation results | Liquid repellency of nozzle plate | ◎ | ○ | ◎ | ○ |
| | Contamination on nozzle plate | ◎ | ○ | ◎ | ○ |
| | Discharge property | ◎ | ◎ | ◎ | ◎ |
| | Image density | ◎ | ◎ | ◎ | ◎ |
| | Fastness to washing | ◎ | ◎ | ○ | ◎ |

| | | Examples | | |
|---|---|---|---|---|
| | | 5 | 6 | 7 |
| Ink base | Aqueous white ink base | 20.0 | 20.0 | 20.0 |
| | Aqueous blue ink base | | | |
| | Aqueous yellow ink base | | | |
| | Aqueous red ink base | | | |
| | Aqueous black ink base | | | |
| Water-dispersible resin | NeoRez R-966 | 24.2 | 24.2 | 24.2 |
| | Bayhydrol UH 650 | | | |
| | TAKELAC W-6110 | | | |
| | Mowinyl 966A | | | |
| Crosslinking agent | Bayhydur BL2867 | 6.0 | 1.0 | 12.0 |
| Surfactant | NEWPOL PE-71 | | 1.0 | 1.0 |
| | NEWPOL PE-62 | | | |
| | SURFYNOL 104PG-50 | 2.0 | | |
| | OLFINE E1010 | 0.4 | 0.4 | 0.4 |
| Water-soluble organic solvent | Glycerin | 18.0 | 18.0 | 18.0 |
| | Propylene glycol | 5.0 | 5.0 | 5.0 |
| | 1,3-butanediol | 2.0 | 2.0 | 2.0 |
| | Water | 22.4 | 28.4 | 17.4 |
| | Total | 100.0 | | |
| Evaluation results | Liquid repellency of nozzle plate | ○ | ◎ | ○ |
| | Contamination on nozzle plate | ○ | ◎ | ○ |
| | Discharge property | ◎ | ◎ | ○ |
| | Image density | ◎ | ◎ | ◎ |
| | Fastness to washing | ◎ | ○ | ◎ |

| | | Examples | | | |
|---|---|---|---|---|---|
| | | 8 | 9 | 10 | 11 |
| Ink base | Aqueous white ink base | 20 | 20 | 20 | |
| | Aqueous blue ink base | | | | 20 |
| | Aqueous yellow ink base | | | | |
| | Aqueous red ink base | | | | |
| | Aqueous black ink base | | | | |
| Water-dispersible resin | NeoRez R-966 | | | | 24.2 |
| | Bayhydrol UH 650 | 16 | | | |
| | TAKELAC W-6110 | | 25 | | |
| | Mowiny1 966A | | | 17.7 | |
| Crosslinking agent | Bayhydur BL2867 | 6 | 6 | 6 | 6 |
| Surfactant | NEWPOL PE-71 | 1 | 1 | 1 | 1 |
| | NEWPOL PE-62 | | | | |
| | SURFYNOL 104PG-50 | | | | |
| | OLFINE E1010 | 0.4 | 0.4 | 0.4 | 0.4 |
| Water-soluble organic solvent | Glycerin | 18 | 18 | 18 | 18 |
| | Propylene glycol | 5 | 5 | 5 | 5 |
| | 1,3-butanediol | 2 | 2 | 2 | 2 |
| | Water | 31.6 | 22.6 | 29.9 | 23.4 |
| | Total | 100.0 | | | |

TABLE 1-continued

| | | | | | |
|---|---|---|---|---|---|
| Evaluation results | Liquid repellency of nozzle plate | ⊚ | ⊚ | ⊚ | ⊚ |
| | Contamination on nozzle plate | ⊚ | ⊚ | ⊚ | ⊚ |
| | Discharge property | ⊚ | ⊚ | ⊚ | ⊚ |
| | Image density | ⊚ | ⊚ | ○ | ⊚ |
| | Fastness to washing | ⊚ | ⊚ | ○ | ⊚ |

| | | Examples | | |
|---|---|---|---|---|
| | | 12 | 13 | 14 |
| Ink base | Aqueous white ink base | | | |
| | Aqueous blue ink base | | | |
| | Aqueous yellow ink base | 20 | | |
| | Aqueous red ink base | | 20 | |
| | Aqueous black ink base | | | 20 |
| Water-dispersible resin | NeoRez R-966 | 24.2 | 24.2 | 24.2 |
| | Bayhydrol UH 650 | | | |
| | TAKELAC W-6110 | | | |
| | Mowinyl 966A | | | |
| Crosslinking agent | Bayhydur BL2867 | 6 | 6 | 6 |
| Surfactant | NEWPOL PE-71 | 1 | 1 | 1 |
| | NEWPOL PE-62 | | | |
| | SURFYNOL 104PG-50 | | | |
| | OLFINE E1010 | 0.4 | 0.4 | 0.4 |
| Water-soluble organic solvent | Glycerin | 18 | 18 | 18 |
| | Propylene glycol | 5 | 5 | 5 |
| | 1,3-butanediol | 2 | 2 | 2 |
| | Water | 23.4 | 23.4 | 23.4 |
| | Total | | 100.0 | |
| Evaluation results | Liquid repellency of nozzle plate | ⊚ | ⊚ | ⊚ |
| | Contamination on nozzle plate | ⊚ | ⊚ | ⊚ |
| | Discharge property | ⊚ | ⊚ | ⊚ |
| | Image density | ⊚ | ⊚ | ⊚ |
| | Fastness to washing | ⊚ | ⊚ | ⊚ |

| | | Comparative Examples | | | | |
|---|---|---|---|---|---|---|
| | | 1 | 2 | 3 | 4 | 5 |
| Ink base | Aqueous white ink base | 20.0 | 20.0 | 20.0 | 20.0 | 20.0 |
| Water-dispersible resin | NeoRez R-966 | 24.2 | 24.2 | 24.2 | 24.2 | 24.2 |
| Crosslinking agent | Bayhydur BL2867 | | 15.0 | | | 6.0 |
| | EPOCROS WS-700 | | | 9.1 | | |
| | CARBODILITE V-02 | | | | 5.7 | |
| Surfactant | NEWPOL PE-71 | 1.0 | 1.0 | 1.0 | 1.0 | |
| | NEWPOL PE-74 | | | | | |
| | SURFYNOL 440 | | | | | |
| | LATEMUL E-150 | | | | | |
| | AMPHITOL 20AB | | | | | |
| | OLFINE E1010 | 0.4 | 0.4 | 0.4 | 0.4 | 0.4 |
| Water-soluble organic solvent | Glycerin | 18.0 | 18.0 | 18.0 | 18.0 | 18.0 |
| | Propylene glycol | 5.0 | 5.0 | 5.0 | 5.0 | 5.0 |
| | 1,3-butanediol | 2.0 | 2.0 | 2.0 | 2.0 | 2.0 |
| | Water | 29.4 | 14.4 | 20.3 | 23.7 | 24.4 |
| | Total | | | 100.0 | | |
| Evaluation results | Liquid repellency of nozzle plate | ⊚ | ⊚ | ⊚ | ⊚ | X |
| | Contamination on nozzle plate | ⊚ | ⊚ | ⊚ | ⊚ | X |
| | Discharge property | ⊚ | X | ⊚ | ⊚ | Δ |
| | Image density | ⊚ | ⊚ | ⊚ | ⊚ | ⊚ |
| | Fastness to washing | X | ⊚ | X | X | ⊚ |

TABLE 1-continued

| | | Comparative Examples | | | | |
|---|---|---|---|---|---|---|
| | | 6 | 7 | 8 | 9 | 10 |
| Ink base | Aqueous white ink base | 20.0 | 20.0 | 20.0 | 20.0 | 20.0 |
| Water-dispersible resin | NeoRez R-966 | 24.2 | 24.2 | 24.2 | 24.2 | 24.2 |
| Crosslinking agent | Bayhydur BL2867 | 6.0 | 6.0 | 6.0 | 6.0 | 6.0 |
| | EPOCROS WS-700 | | | | | |
| | CARBODILITE V-02 | | | | | |
| Surfactant | NEWPOL PE-71 | 4.0 | | | | |
| | NEWPOL PE-74 | | 1.0 | | | |
| | SURFYNOL 440 | | | 1.0 | | |
| | LATEMUL E-150 | | | | 3.0 | |
| | AMPHITOL 20AB | | | | | 3.3 |
| | OLFINE E1010 | 0.4 | 0.4 | 0.4 | 0.4 | 0.4 |
| Water-soluble organic solvent | Glycerin | 18.0 | 18.0 | 18.0 | 18.0 | 18.0 |
| | Propylene glycol | 5.0 | 5.0 | 5.0 | 5.0 | 5.0 |
| | 1,3-butanediol | 2.0 | 2.0 | 2.0 | 2.0 | 2.0 |
| | Water | 20.4 | 23.4 | 23.4 | 21.4 | 21.1 |
| | Total | | | 100.0 | | |
| Evaluation results | Liquid repellency of nozzle plate | ⊚ | X | X | X | X |
| | Contamination on nozzle plate | ⊚ | X | X | X | X |
| | Discharge property | ⊚ | ⊚ | ⊚ | ⊚ | ⊚ |
| | Image density | ○ | ○ | ○ | X | X |
| | Fastness to washing | X | ○ | ○ | Δ | Δ |

As illustrated in each of the Examples, the ink composition for aqueous inkjet textile printing of the present invention was excellent in nozzle plate liquid repellency, contamination protection of a nozzle plate, discharge property, and fastness to washing on textile printed portions, and additionally provided high image density in textile printing.

In contrast, Comparative Example 1 in which a crosslinking agent was not included was poor in fastness to washing, and Comparative Example 2 in which a crosslinking agent was excessively included was poor in discharge property. Comparative Examples 3 and 4 in which a crosslinking agent other than the blocked isocyanate was included was poor in fastness to washing.

Furthermore, Comparative Example 5 in which a surfactant having an HLB of 1.0 to 5.0 was not used was poor in nozzle plate liquid repellency, contamination protection of a nozzle plate, and discharge property. Comparative Example 6 in which a surfactant was excessively included was poor in fastness to washing.

Comparative Examples 7 and 8 that included only a surfactant having an HLB value exceeding 5.0 were poor in nozzle plate liquid repellency, which caused contamination of the nozzle plate. Furthermore, Comparative Examples 9 and 10 that included a surfactant that was not a nonionic surfactant in combination with a surfactant having an HLB value exceeding 5.0 were poor in nozzle plate liquid repellency, which caused contamination of the nozzle plate, and provided insufficient image density.

What is claimed:

1. An aqueous inkjet textile printing ink composition, containing a pigment, a water-dispersible resin, a surfactant, a crosslinking agent, and water, wherein as the surfactant, a nonionic surfactant having a hydrophilic-lipophilic balance (HLB) of 1.0 to 3.5 is contained by 0.1 to 2.0% by mass relative to a total amount of the ink composition, wherein the nonionic surfactant includes a polyoxyethylene polyoxypropylene block polymer, and as the crosslinking agent, a blocked isocyanate is contained by 0.1 to 5.0% by mass relative to the total amount of the ink composition.

2. The aqueous inkjet textile printing ink composition according to claim 1, wherein the surfactant contains a nonionic surfactant having an HLB of 1.0 to 3.0.

3. The aqueous inkjet textile printing ink composition according to claim 1, wherein the water-dispersible resin contains at least one selected from the group consisting of a urethane-based resin and a styrene acrylic-based resin.

4. The aqueous inkjet textile printing ink composition according to claim 2, wherein the water-dispersible resin contains at least one selected from the group consisting of a urethane-based resin and a styrene acrylic-based resin.

* * * * *